Aug. 9, 1955          F. D. HARRIS          2,714,933
AUXILIARY ENDLESS-TREAD TRACTION DEVICE FOR VEHICLES
Filed June 5, 1953                    2 Sheets-Sheet 1
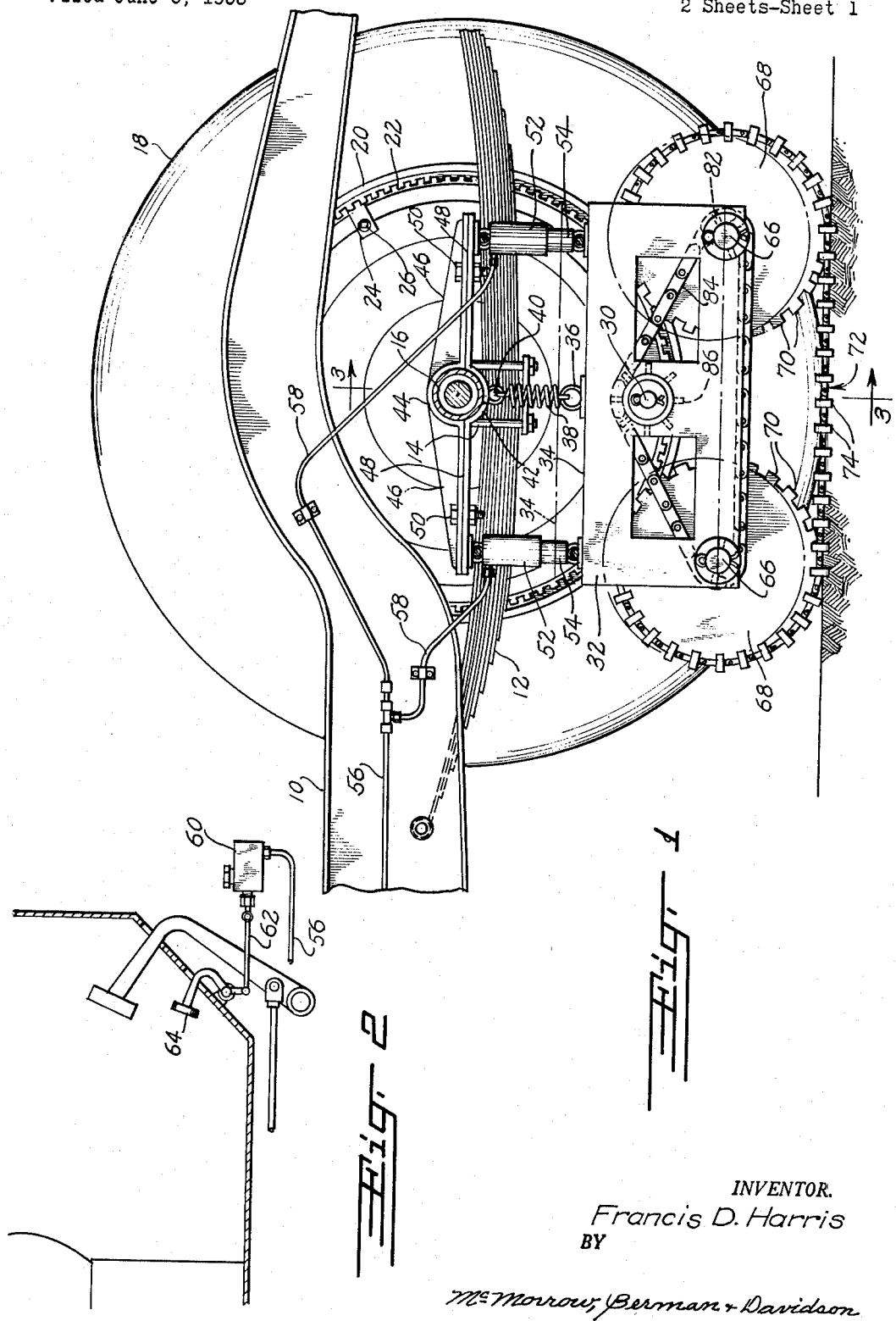
INVENTOR.
Francis D. Harris
BY
McMorrow, Berman + Davidson
ATTORNEYS Aug. 9, 1955
F. D. HARRIS
2,714,933
AUXILIARY ENDLESS-TREAD TRACTION DEVICE FOR VEHICLES
Filed June 5, 1953
2 Sheets-Sheet 2
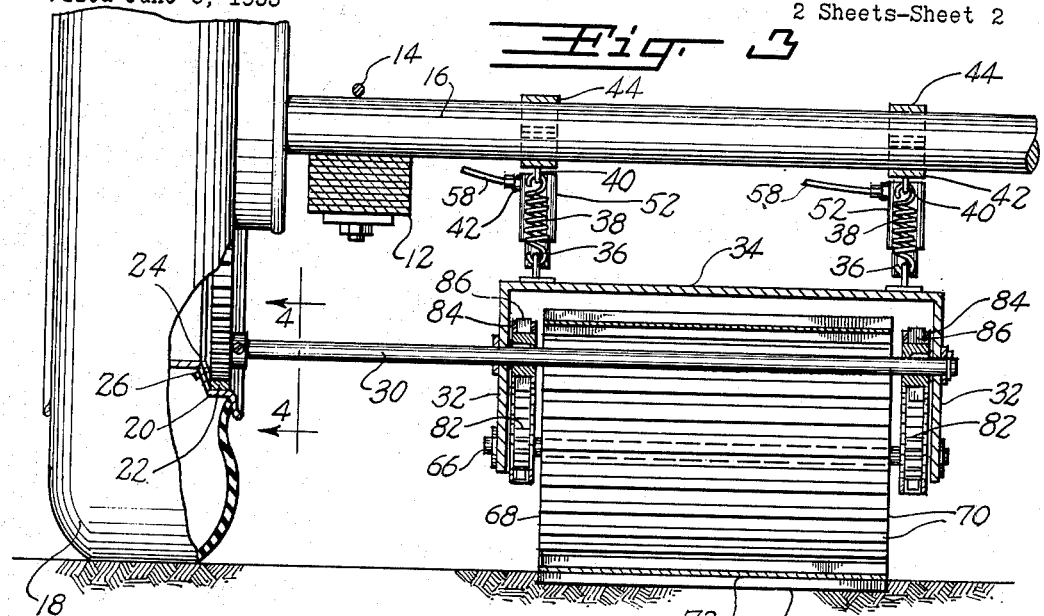
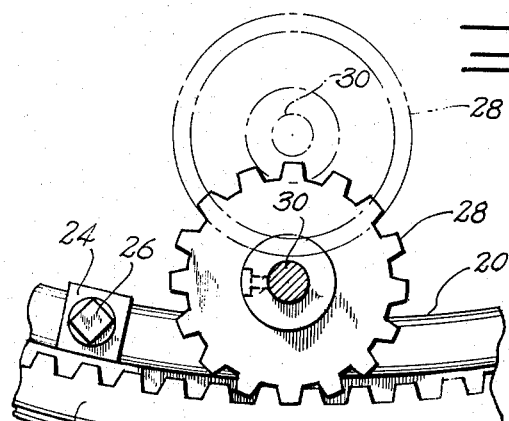
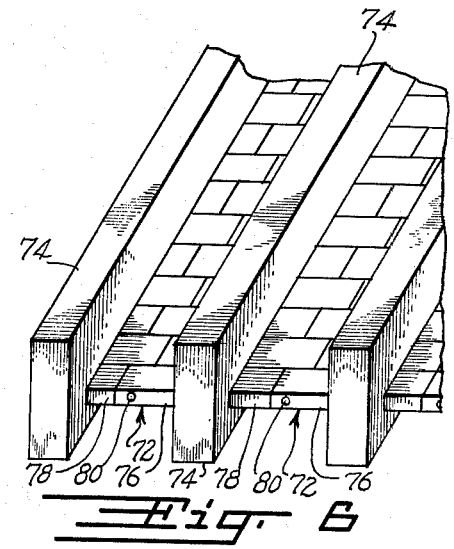
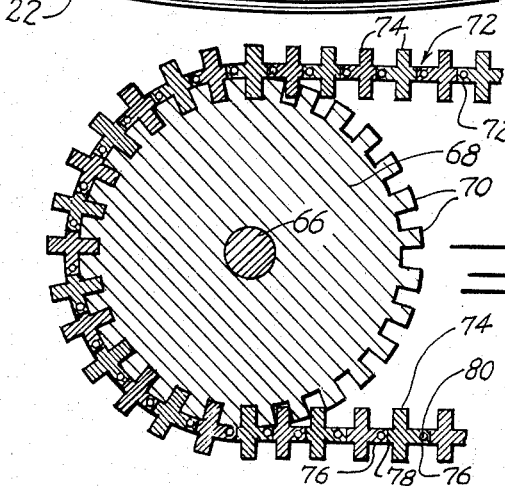
INVENTOR.
Francis D. Harris
BY
McMorrow, Berman & Davidson
ATTORNEYS

United States Patent Office 2,714,933
Patented Aug. 9, 1955

2,714,933

AUXILIARY ENDLESS-TREAD TRACTION DEVICE FOR VEHICLES

Francis D. Harris, Yeadon, Pa.

Application June 5, 1953, Serial No. 359,775

3 Claims. (Cl. 180—9.1)

Summarized briefly, this invention is a traction device that includes a frame means suspended from the underside of a vehicle adjacent one of the vehicle drive wheels; a hydraulic system operable by the vehicle operator for effecting up and down adjustments of the frame means to dispose the traction device operatively or inoperatively, as desired; a series of toothed rollers mounted upon the frame means and having a cleated traction belt in mesh therewith, said belt being so disposed as to bite into the supporting surface to provide added traction for the vehicle when the frame means is adjusted downwardly; and a drive linkage extending from said drive wheel of the vehicle to the rollers.

One feature of the invention believed to be of importance resides in the use of a hydraulic mechanism, controllable by depression of a foot pedal located within the passenger compartment of the vehicle, for lowering the device into an operative position where it will provide added traction for the vehicle. Another feature considered to be of importance is found in the particular means whereby the entire device is suspended from the axle housing of the vehicle, said means being so designed as to facilitate mounting or dismounting of the entire device, and being further designed to permit use of the device with a minimum of modification or redesign of the associated parts of the vehicle.

Still another feature believed to be of importance resides in the particular formation and relative arrangement of the multiplicity of toothed rollers, and cleated traction belt trained thereabout.

Important objects of the invention are to provide a traction device which will be inexpensive; will be mountable upon a vehicle with ease; will be controllable from a location remote from the drive wheels of the vehicle; will be controlled with a high degree of accuracy; and will be rugged and substantially trouble free in operation.

Other objects will appear from the following description, the claims appended thereto, and from the annexed drawings, in which like reference characters designate like parts throughout the several views, and wherein:

Figure 1 is a side elevational view of a traction device formed in accordance with the present invention, as it appears when mounted upon a vehicle, the traction device being operatively positioned and the vehicle being shown fragmentarily and in section;

Figure 2 is a somewhat diagrammatic view showing the means whereby the positioning of the device is controlled by the vehicle operator;

Figure 3 is a sectional view taken substantially on line 3—3 of Figure 1;

Figure 4 is an enlarged, fragmentary, detail sectional view taken on line 4—4 of Figure 3, the dotted lines indicating the inoperative position of a drive pinion and the full lines indicating the operative position of said pinion;

Figure 5 is a fragmentary longitudinal sectional view through the traction means of the device; and Figure 6 is an enlarged, fragmentary, perspective view of the traction belt.

The reference numeral 10 designates a frame member of a vehicle, said frame member having the conventional springs 12 clamped as at 14 to the axle housing 16, the vehicle being provided with a drive wheel 18. The traction device constituting the present invention, it should be noted at this point, can be mounted adjacent one drive wheel, as a single aid to traction. Alternatively, a pair of identical traction devices could be utilized, said device to be secured adjacent both drive wheels of the vehicle. If the vehicle has a four-wheel drive, a traction device formed in accordance with the present invention could be mounted in association with each of the several drive wheels.

In the illustrated example of the invention, the vehicle wheel 18 is provided with the usual wheel rim 20, and secured fixedly to said wheel rim, at the inside of the drive wheel 18 (Figure 3) is a ring gear 22. Ring gear 22 can be secured to the rim by means of circumferentially spaced, inwardly extending ears 24 apertured to receive bolts or equivalent fastening elements 26, that extend through openings formed in the rim.

In a commercial embodiment of the invention, it might be desired to form the ring gear as an integral portion of the wheel rim. This is believed sufficiently obvious as not to require special illustration herein.

A drive pinion 28 is adapted to mesh with the ring gear, as shown in Figure 4, and is secured to one end of an elongated drive shaft 30. The drive shaft 30 is extended in parallelism with the axle housing 16, and is journaled for rotation in the opposite, depending side walls 32 of an open bottomed frame 34 of inverted U shape. The frame 34 has a rectangular outer configuration when viewed in top plan, and spaced transversely of the frame, intermediate the opposite ends thereof, are upwardly extending eyes 36 to which are hooked the lower ends of coil springs 38, the upper ends of which are hooked through depending eyes 40 secured fixedly to the underside of an arcuate, lower clamp member 42. The lower clamp member 42 engages the underside of the axle housing 16, and cooperating with the lower clamp member and extending over the upper surface of the axle housing is an upper clamp member 44 (Figure 1).

Integral with the clamp members 44, 42 are horizontally disposed, elongated support members 46, 48 respectively, the members 46, 48 being fixedly connected to one another at opposite sides of the axle housing by bolts 50. The clamp members 42, 44 and their associated members 46, 48, cooperate to define a relatively elongated support that is clampably engaged medially between its ends to the axle housing, and is disposed transversely of the housing, the ends of said support being spaced laterally of the housing in opposite directions.

Depending from the opposite ends of the two supports that would normally be associated with a single frame 34 (see Figure 3) are hydraulic cylinders 52 having piston or ram members 54 projecting from the lower ends thereof. The piston or ram members are pivotally connected to the several corners of the rectangular frame, it being understood that the upper ends of the cylinders 52 would be pivotally connected to the ends of the supports carried by the axle housing.

It will be appreciated that the springs 38 would be so tensioned as to normally exert upward pull upon the frame, tending to elevate the frame to the dotted line position shown in Figure 1. However, under the control of a user, the hydraulic ram means defined by cylinders 52 and piston members 54 can be operated to extend said ram means and force the frame downwardly to the full line position shown in Figure 1, said full line position being appropriately considered the operative position of the device.

To control the hydraulic means for lowering the frame, I provide a main hydraulic fluid line 56, through which fluid is supplied under pressure to branch line 58 extending to the several cylinders 52. The line 56 extends from a master cylinder 60, to which extends a reciprocable plunger 62. Plunger 62 is given movement in the direction of its length by depression of a pivoted foot pedal 64 mounted within the passenger compartment of the vehicle, preferably adjacent the brake pedal.

It will be understood that when the shaft 30 is rotated, the ground-engaging traction means will be powered, for the purpose of providing the vehicle with the necessary traction. In this connection, the traction means includes end shafts 66 journaled at their opposite ends in the end portions of the frame 34, said shafts extending transversely of the frame and being keyed or otherwise fixedly connected to rollers 68. Rollers 68 are each formed with a circumferential series of longitudinally extending, spaced ribs or teeth 70, and meshing with said teeth is a traction belt 72 trained about both rollers.

The particular construction of the traction belt has been shown to advantage in Figure 6, and in a preferred construction, the traction belt would include parallel cleats 74 of rectangular cross section, said cleats extending the full width of the traction belt and meshing with the ribs or teeth of the rollers 68. Each cleat would be rigid at one side thereof with a long link member 76, and would be rigid at the other side thereof with a short link member 78. Long and short link members would alternate, transversely of the belt, and pivotally connecting the alternating members to one another are hinge pins 80. In effect, a piano hinge is thus defined between each pair of adjacent cleats 74, thus to articulate the endless traction belt throughout its length and assure that the belt will have a sufficient amount of flexibility when in use.

To drive the rollers 68, I provide sprockets 82, that are keyed to the shafts 66, or are otherwise secured to said shafts to rotate therewith. A drive chain 84 is in mesh with the sprockets 82, and is driven from a drive sprocket 86 secured to the shaft 30.

When the vehicle is being operated under normal driving conditions, the frame 34 would be disposed in the dotted line position shown in Figure 1. In this position of the device, the traction belt 72 will be out of engagement with the supporting surface. Further, in this position of the frame 34, the drive pinion 28 will be disposed in the dotted line position thereof shown in Figure 4, and will not be rotated by the ring gear.

If, however, driving conditions become such as to make it necessary that the vehicle have added traction, the vehicle operator need only depress the foot pedal 64. In this way, hydraulic pressure will be transmitted to the cylinders connected to the frame 34, and said hydraulic pressure will be operative to lower the frame. This causes the traction belt to bite into the ground surface, and at the same time, the drive pinion 28 is lowered into mesh with the ring gear. Operation of the vehicle in the usual manner will now be effective to impart a positive drive to the cleated traction belt, thus to cause the vehicle to be given the added traction.

When only a single device is to be used, it would preferably be installed close to the rear, left drive wheel, below the axle housing. If a pair of the traction devices is used, the devices comprising said pair would be installed adjacent the left and right drive wheels.

It will be seen that the device will provide the vehicle operator with an instant means for protection against skidding, as well as with sure traction on icy and snowy surfaces, in mud, etc. The use of the conventional antiskid chains, which are difficult to mount and which must usually be removed with equal difficulty and inconvenience, is thus eliminated, the invention being so designed as to permit it to be a permanent attachment to the vehicle. The construction, in fact, not only allows the device to be maintained as a permanent attachment to the vehicle, but also permits the device to be lowered into an operative position without bringing the vehicle to a full stop, it being necessary only that the vehicle be slowed substantially, while the traction belt is being lowered into engagement with the supporting surface.

Of course, detent means could be provided, in association with the depressible pedal 64, to releasably hold the pedal in its depressed position, while the vehicle is being given the added traction desired. This might be desirable where the device is to be used for a relatively long period of time without interruption.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the apppended claims.

What is claimed is:

1. In a traction device for a vehicle having an axle housing and a drive wheel, a plurality of elongated supports adapted to be fixedly connected intermediate their ends to said axle housing, said supports being spaced longitudinally of and respectively extending transversely of said axle housing; a frame having an inverted U-shaped cross section, said frame including a horizontal top wall and vertical side walls depending from opposite side edges of said top wall, said supports extending parallel with said side edges of the top wall, and being spaced above and substantially vertically of the respective side edges of the top wall, the opposite ends of the supports terminating above the opposite ends of said top wall; rollers spaced longitudinally of the frame between the side walls of the frame, said rollers being journalled upon the side walls at locations spaced longitudinally of the side walls; a traction belt trained about said rollers; rectangularly spaced means extending between the frame and said supports, said means extending downwardly from the opposite ends of the respective supports to the opposite ends of said top wall of the frame, said means being adapted for forcing the frame downwardly to engage the traction belt against the ground surface; spring means connected between the midlength portion of the frame and the respective supports, said spring means being adapted for normally exerting a pull upon the frame in an upward direction sufficient to shift the traction belt out of engagement with the ground surface; a drive-transmitting linkage extending between said drive wheel and said rollers, for rotating the rollers responsive to rotation of the drive wheel, and means under the control of an operator for actuating the first named means to shift the frame downwardly against the restraint of said spring means.

2. In a traction device for a vehicle having an axle housing and a drive wheel, a plurality of elongated supports adapted to be fixedly connected intermediate their ends to said axle housing, said supports being spaced longitudinally of and respectively extending transversely of said axle housing; a frame having an inverted U-shaped cross section, said frame including a horizontal top wall and vertical side walls depending from opposite side edges of said top wall, said supports extending parallel with said side edges of the top wall, and being spaced above and substantially vertically of the respective side edges of the top wall, the opposite ends of the supports terminating above the opposite ends of said top wall; rollers spaced longitudinally of the frame between the side walls of the frame, said rollers being journalled upon the side walls at locations spaced longitudinally of the side walls;

a traction belt trained about said rollers; rectangularly spaced means extending between the frame and said supports, said means extending downwardly from the opposite ends of the respective supports to the opposite ends of said top wall of the frame, said means being adapted for forcing the frame downwardly to engage the traction belt against the ground surface; spring means connected between the midlength portion of the frame and the respective supports, said spring means being adapted for normally exerting a pull upon the frame in an upward direction sufficient to shift the traction belt out of engagement with the ground surface; a drive-transmitting linkage extending between said drive wheel and said rollers, for rotating the rollers responsive to rotation of the drive wheel, and means under the control of an operator for actuating the first named means to shift the frame downwardly against the restraint of said spring means, said first named means comprising a series of hydraulic rams, said rams being connected as part of a common system adapted for balancing equally the pressures exerted through the several rams, the top wall of the frame being of rectangular configuration in substantial correspondence with the rectangular spacing of the hydraulic rams, with said rams extending to the several corners of the top wall, whereby to apply a balanced, equal force against the frame at the several corners thereof tending to shift the same into engagement with the ground surface.

3. In a traction device for a vehicle having an axle housing and a drive wheel, a plurality of elongated supports adapted to be fixedly connected intermediate their ends to said axle housing, said supports being spaced longitudinally of and respectively extending transversely of said axle housing; a frame having an inverted U-shaped cross section, said frame including a horizontal top wall and vertical side walls depending from opposite side edges of said top wall, said supports extending parallel with said side edges of the top wall, and being spaced above and substantially vertically of the respective side edges of the top wall, the opposite ends of the supports terminating above the opposite ends of said top wall; rollers spaced longitudinally of the frame between the side walls of the frame, said rollers being journalled upon the side walls at locations spaced longitudinally of the side walls; a traction belt trained about said rollers; rectangularly spaced means extending between the frame and said supports, said means extending downwardly from the opposite ends of the respective supports to the opposite ends of said top wall of the frame, said means being adapted for forcing the frame downwardly to engage the traction belt against the ground surface; spring means connected between the midlength portion of the frame and the respective supports, said spring means being adapted for normally exerting a pull upon the frame in an upward direction sufficient to shift the traction belt out of engagement with the ground surface; a drive-transmitting linkage extending between said drive wheel and said rollers, for rotating the rollers responsive to rotation of the drive wheel, and means under the control of an operator for actuating the first named means to shift the frame downwardly against the restraint of said spring means, said first named means comprising a series of hydraulic rams, said rams being connected as part of a common system adapted for balancing equally the pressures exerted through the several rams, the top wall of the frame being of rectangular configuration in substantial correspondence with the rectangular spacing of the hydraulic rams, with said rams extending to the several corners of the top wall, whereby to apply a balanced, equal force against the frame at the several corners thereof tending to shift the same into engagement with the ground surface, said spring means comprising a pair of springs spaced transversely of the frame, each spring being aligned with the hydraulic rams depending from opposite ends of the support associated with said spring, each spring being spaced equal distances from the hydraulic rams of the support associated with the spring.

References Cited in the file of this patent

UNITED STATES PATENTS

| | | |
|---|---|---|
| 1,642,960 | Krantz | Sept. 20, 1927 |
| 1,729,374 | Ehrhart | Sept. 24, 1929 |
| 2,112,781 | Lisov | Mar. 29, 1938 |

FOREIGN PATENTS

| | | |
|---|---|---|
| 108,013 | Switzerland | May 16, 1925 |